Aug. 10, 1926.

I. A. TREIMAN

BULL HOOK

Filed Sept. 25, 1924

INVENTOR
Isaack A. Treiman
BY
Fred C. Matheny
ATTORNEY

Aug. 10, 1926.

I. A. TREIMAN

BULL HOOK

Filed Sept. 25, 1924

INVENTOR
Isaack A. Treiman
BY
Fred C. Matheny
ATTORNEY

Patented Aug. 10, 1926.

1,595,264

UNITED STATES PATENT OFFICE.

ISAACK A. TREIMAN, OF SEATTLE, WASHINGTON.

BULL HOOK.

Application filed September 25, 1924. Serial No. 739,781.

My invention relates to improvements in hooks of the form that are provided with safety devices or gates for opening and closing the hook and that are used extensively in logging operations in heavy timber and the object of my invention is to provide a hook having a safety gate that is easy to operate and requires very little time to open and close thereby saving time and labor.

Other objects are to provide a hook of this nature that is strong and durable in construction, simple and inexpensive to manufacture, efficient in operation, not liable to get out of order and one that has its operating parts protected in such a manner as to safeguard them from serious damage.

A more specific object is to provide a hook of this nature having a safety member arranged to close the opening between the point and shank of the hook, which safety member is shaped so that it may be firmly grasped by hand and has a push button type of locking device which may be readily released by pressure of the thumb to permit the safety member to be turned sidewise into an open position.

Further objects will be apparent from the following description taken in connection with the accompanying drawings.

In the drawings, Figure 1 is a view in side elevation of a bull hook constructed in accordance with my invention.

Figure 5:
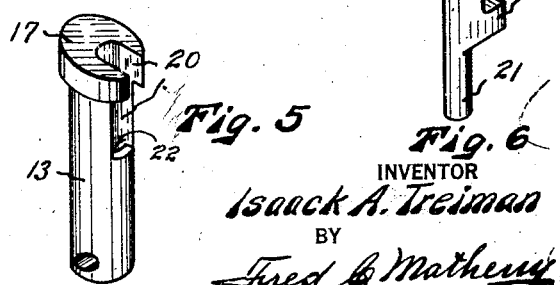
Figure 6:
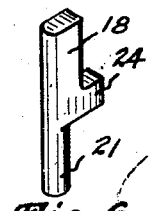

Figs. 5 and 6 detached isometric views of details of the invention.

Figure 7:
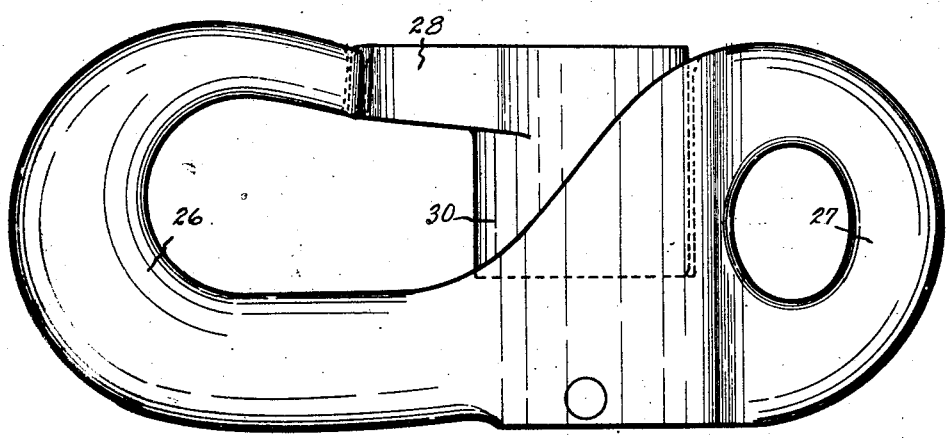

Fig. 7 is a view in side elevation showing an adaption of my invention to a choker hook.

Figure 8:
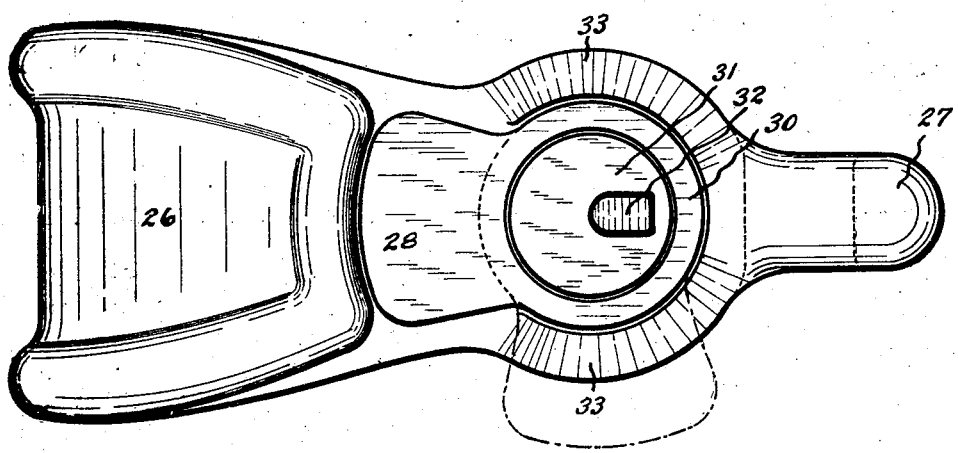

Fig. 8 is a plan view of the device shown in Fig. 7.

Like reference numerals designate like parts throughout the several views.

In the drawings 5 designates a hook having the usual eye 6 and point 7 and of substantially the conventional hook shape except that it is provided just forward of the eye 6 with an enlarged hub portion 8 affording the necessary strength for the mounting thereon of a safety gate 10 that is arranged to close the usual gap between the point and the shank of the hook or to be turned to one side to leave said gap open.

The safety gate 10 has an enlarged cylindrical base 11 bored as at 12 for the reception of a pivot pin 13 and counterbored on the top as at 14 and on the bottom as at 15 and provided with a locking notch 16 that extends upwardly from the ledge formed by bottom counterbore 15.

The counterbore 14 is arranged to receive the head 17 of pivot pin 13 and is deep enough to afford a countersunk recess above said pivot pin head 17 wherein the upper end of a locking member 18 may be operatively disposed in such a manner that it will be shielded and protected from blows and from contact with logs or other objects. The locking member 18 is operatively disposed wthin a slot 20 on pivot pin 13 and the lower end 21 of said locking member, which is of smaller size, projects into a perforation 22 in the pivot pin 13 and engages with a compression spring 23 that urges the locking member upwardly. The locking member 18 has a locking dog 24 projecting from one side thereof that is arranged to lock into notch 16 in safety gate 10 when said gate is in the position shown in Figure 3 or to permit said gate to turn freely when the locking member is depressed far enough to bring the locking dog 24 into alignment with the bottom counterbore 15.

The pivot pin 13 is rigidly secured to the hook 5 by a transverse key or pin 25 that prevents rotation or longitudinal movement of said pivot pin.

The recess in pivot pin 13 for the reception of locking member 18 may be formed by boring a hole the same size as hole 22 downwardly from the top of the pivot pin and then slotting one side of said hole downwardly for the desired depth to form the slot 20 wherein the larger upper end and the locking dog of said locking member operate.

The eye member 6 of the hook is preferably made of substantially the shape shown to afford maximum protection for the base 11 of the safety gate and prevent objects from striking against said base.

Figure 1:
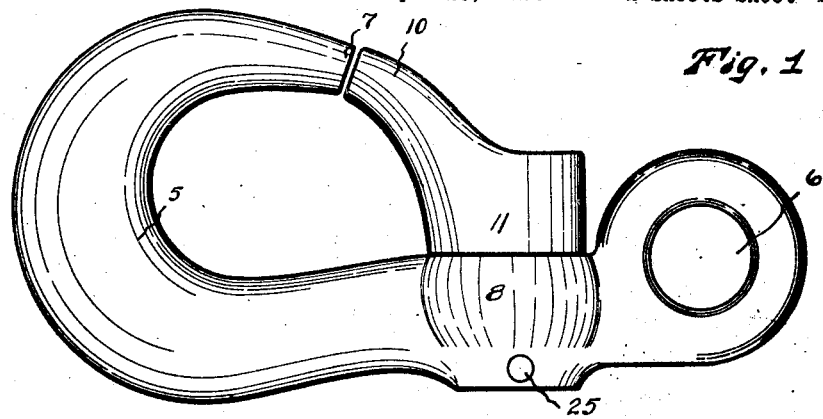
Figure 2:
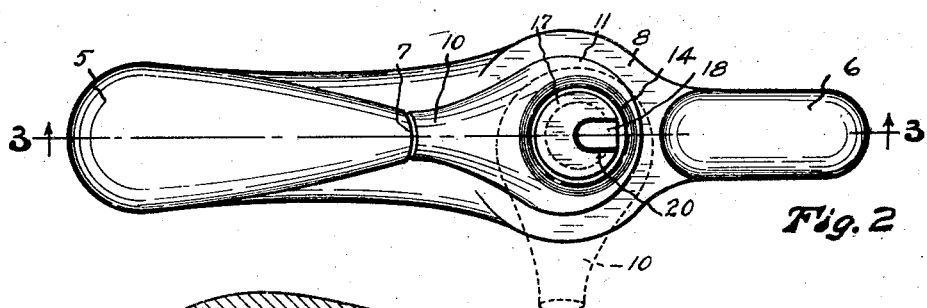
Fig. 2 is a plan view of the same showing the safety device turned to one side to leave the hook open.
Figure 3:
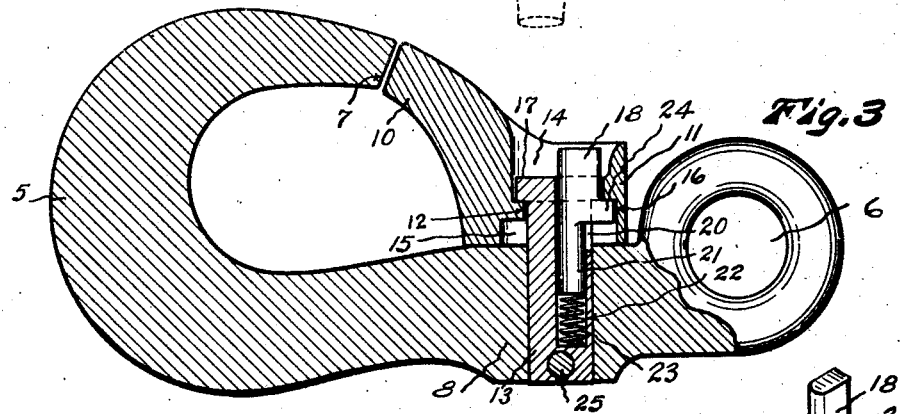
Fig. 3 is a sectional view substantially on broken line 3—3 of Fig. 2 except that the safety is shown in a closed position.
Figure 4:
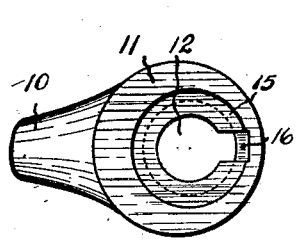
Fig. 4 is a bottom plan view of a safety gate member.

In the operation of this device when the safety gate 10 is in the closed position shown in Figs. 1 and 3 it will prevent the hook 5 from releasing any member with which it may be engaged. When the safety gate is to be opened the operator grasps the gate in one hand, depresses the locking member 18 with the thumb to move locking dog 24 out of notch 16 and into alignment with counterbore 15 and turns the safety gate to one side as shown in Fig. 2. This permits the hook to be freely engaged with or disengaged from any object as a chain or cable to which it is to be secured. When the safety gate is turned back into alignment with the hook locking dog 24 will snap into notch 16 and lock the gate in the closed position.

In Figs. 7 and 8 I have shown an adaptation of the device to a broad heavy hook of the form commonly termed a choker hook. In this adaptation I have shown a relatively broad hook portion 26 that terminates at the rear end in an eye 27. A safety gate 28 having a large cylindrical hub 30 is mounted on a pivot 31 at the throat of the hook and is arranged to be locked and released by a push button device 32, all of the parts above mentioned being of substantially the same as the corresponding parts previously described except that they are of different shape to conform to the requirements of the different type of hook. The hub 30 of the hook is disposed within a recess formed by two side flanges 33 that extend forwardly from the eye portion 27 in downwardly inclined relation and serve as guard members that protect the hub 30 from striking against or being struck by heavy objects.

The push button 32 in Figs. 7 and 8 is countersunk into the hub 30 and is mounted and arranged in the same manner as the member 18 hereinbefore described so that it may be depressed to release gate 28 and permit said gate to be turned to one side as shown in Fig. 8 so that a cable may be drawn through the hook.

The device is very easy and convenient to operate, will not bind, will not release accidentally and can be easily manipulated with one hand.

I am aware that many hooks having releasable safety gates for preventing them from coming unhooked have been made prior to my invention and I am familiar with many of the defects in these hooks and have endeavored to overcome such defects in this hook.

While my invention is confined to the particular construction of my hook and safety gate it will be understood that various changes in the same may be resorted to within the scope and spirit of the following claims.

I claim:

1. In a hook of the class described a hook member having a shank that terminates in an eye, a pivot rigid with said shank and projecting from the inner side of the same adjacent said eye, a locking member movable endwise in said pivot, the upper end of said locking member forming push means that may be depressed to release said locking member, and a gate member mounted on said pivot and arranged to be turned thereon into an open or closed position, said locking member being arranged to lock said gate member in a closed position.

2. The combination with a hook, of a safety gate for closing the throat of said hook, a pivot for said safety gate and a releasable locking member disposed within said pivot for locking said safety gate in a closed position.

3. The combination with a hook, of a safety gate having a hub portion arranged to rest on the shank of the hook and having a bore in said hub that is counterbored on the outer side, a pivot member securing said safety gate to said hook and a locking member disposed within said pivot member having its outer end shielded within said counterbore said locking member being arranged to releasably lock said safety gate in closed position.

4. In a hook of the class described a hook member having a shank that terminates in an eye, an enlarged hub portion formed in said shank adjacent said eye, a pivot pin rigidly secured in said hub portion and projecting from the inner side of said shank in substantially the medial plane of the hook, said pivot pin having a recess extending from the upper end downwardly the upper end of said recess being in the form of a slot, a locking member movable in said recess, a spring urging said locking member outwardly, a locking dog on said locking member projecting outwardly through said slot, a safety gate having a cylindrical base pivotally supported on said pivot pin the bottom end of said cylindrical base being counterbored to afford clearance for said locking dog and having a notch into which said locking dog may lock and the upper end of said cylindrical base being counterbored to afford a recess wherein said locking member may terminate said locking member being arranged to be manually depressed to release said locking dog.

The foregoing specification signed at Seattle, Washington, this 28th day of August, 1924.

ISAACK A. TREIMAN.